March 14, 1961

C. W. MORRIS ET AL 2,974,900

AIRCRAFT FLIGHT CONTROL SYSTEM

Filed March 11, 1959

INVENTORS.
CHARLES W. MORRIS
ARTHUR R. BECKINGTON
BY

ATTORNEYS.

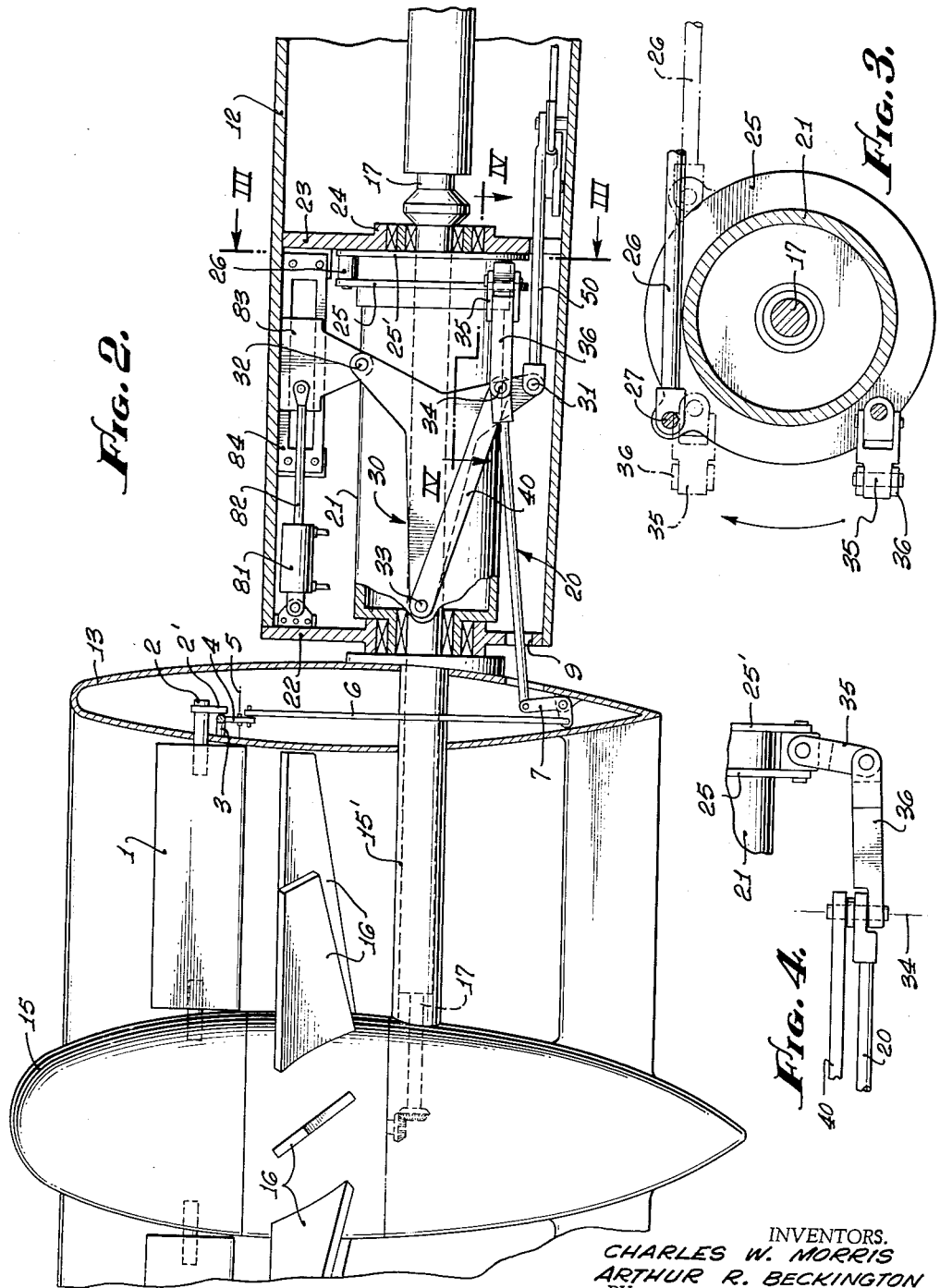

March 14, 1961 C. W. MORRIS ET AL 2,974,900
AIRCRAFT FLIGHT CONTROL SYSTEM
Filed March 11, 1959 5 Sheets-Sheet 3

INVENTORS.
CHARLES W. MORRIS
ARTHUR R. BECKINGTON
BY
ATTORNEYS.

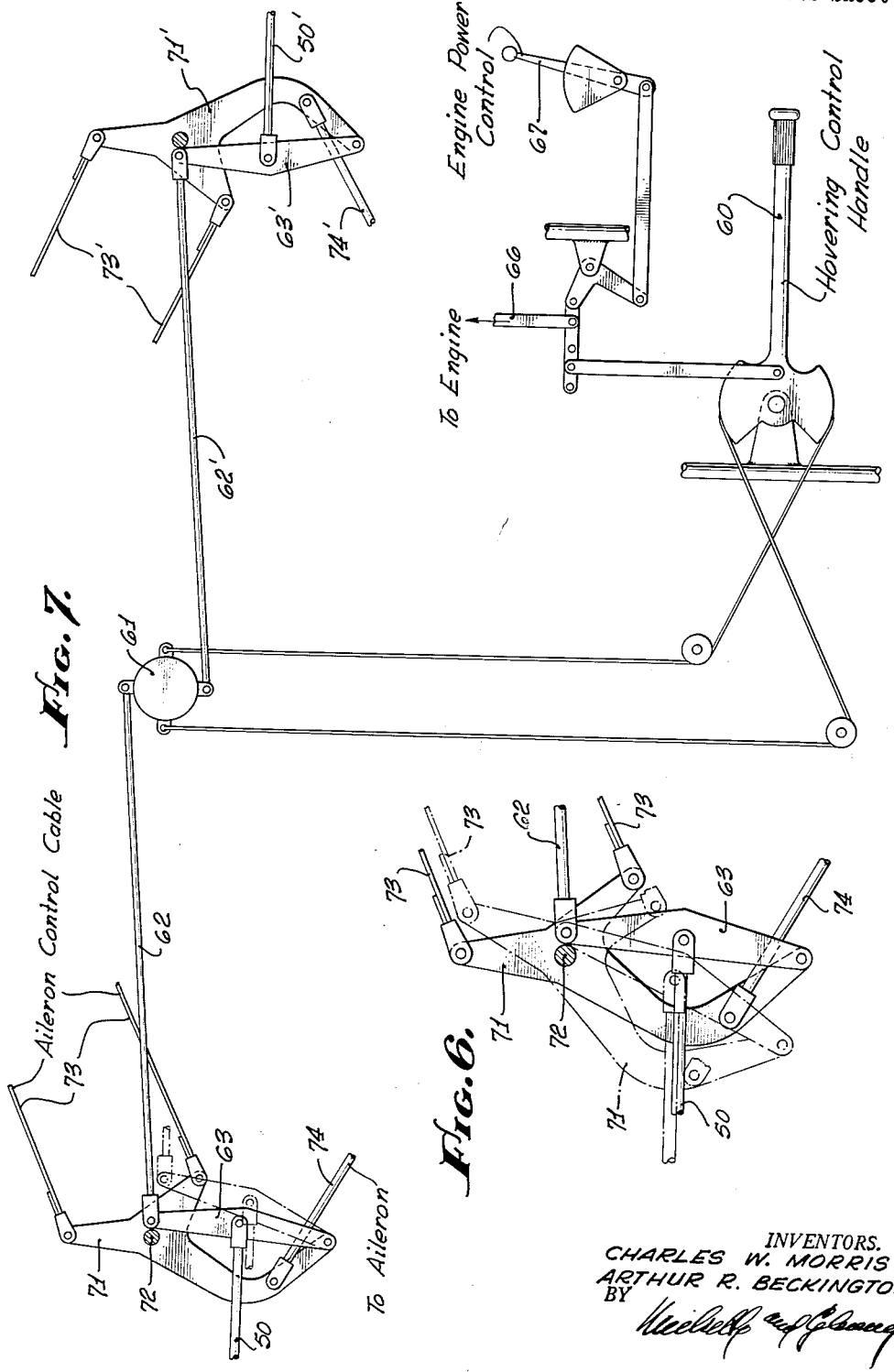

March 14, 1961

C. W. MORRIS ET AL 2,974,900

AIRCRAFT FLIGHT CONTROL SYSTEM

Filed March 11, 1959

INVENTORS.
CHARLES W. MORRIS
ARTHUR R. BECKINGTON
BY

ATTORNEYS.

United States Patent Office 2,974,900
Patented Mar. 14, 1961

2,974,900

AIRCRAFT FLIGHT CONTROL SYSTEM

Charles W. Morris, Los Angeles, and Arthur R. Beckington, San Pedro, Calif., assignors to Doak Aircraft Co., Inc., Torrance, Calif., a corporation of California Filed Mar. 11, 1959, Ser. No. 798,779

12 Claims. (Cl. 244—12)

This invention relates to an improved control system for airplanes and although it is applicable to a variety of airplanes, it is of particular utility when applied to an airplane which has ducted fan propulsion units located on either side of the longitudinal axis of the airplane. Airplanes of this type have been disclosed in prior United States Letters Patent No. 2,730,311 and in copending applications Serial Nos. 472,313 filed December 1, 1954, and now abandoned, and 594,537, filed June 28, 1956.

As described in the aforementioned copending application Serial No. 472,313, it is desirable to have an aircraft provided with means for facilitating take off and landing on short runways and capable of substantial hovering. Such an aircraft may employ thrust-generating propulsion units, each unit comprising an open-ended or tubular duct (preferably having a wall of airfoil section) and an impeller or multi-bladed element mounted for rotation within such duct about an axis coincidental with the axis of such duct. These propulsion units may be carried by the lateral extremities of the wings and be provided with means for rotating each such propulsion unit about an axis transverse to the longitudinal axis of the aircraft whereby the direction and angle of the thrust generated by the units may be controllably varied through a range of 90° when the units are rotated from horizontal to vertical position. The location of the units is such that the thrust generated and delivered by them does not impinge upon the wings or body of the aircraft and instead is utilized most effectively. Such an arrangement permits the aircraft to become airborne and to land in a virtually vertical manner and also to fly at a relatively high forward speed after becoming airborne.

The invention described in the forementioned application Serial No. 594,537 includes a flight control system for an aircraft having a thrust-generating propulsion unit rotatably mounted on either side of the longitudinal axis of an aircraft. This control system was adapted to operate in conjunction with the basic or conventional control systems employing the normal surfaces of an aircraft such as rudders, elevators and ailerons. The control system of this copending application included means for varying of the thrust of each propulsion unit either in a complementary manner to control the rolling motion of the aircraft, or in a uniform manner to control the elevational or lifting effect on the aircraft when the propulsion units were in a vertical position. The means employed did not depend upon the normal control surfaces such as the ailerons but instead utilized pivotally mounted radial vanes in the inlet portion of each duct which supplemented the normal control surfaces to allow the complementary or uniform variation of the thrust in each propulsion unit when the aircraft was being lifted in a substantially vertical direction. In such a position, the forward velocity of the aircraft is insufficient to permit the normal control surfaces, such as the ailerons, to perform their normal control functions. In addition, this control system included means for moving the radial vanes to uniformly vary the thrust of each of the propulsion units when they were in the horizontal position or forward flight position. The thrust in each of the units was varied uniformly without change in the speed of the particular driving engine or in the pitch angle of the impellers positioned within the propulsion units.

The present invention is an improvement on the control system disclosed in copending application Serial No. 594,537 and provides means for eliminating the possibility of imparting complementary movement to the radially extending vanes in one unit with respect to the vanes in the other unit when the units are in horizontal position. While it may be desirable to uniformly or homologously vary the thrust of the units in the horizontal position, any complementary variance in the thrust when the aircraft is in horizontal or forward flight position would cause the aircraft to yaw about its vertical or yaw axis. Excessive yawing action is dangerous for an aircraft in horizontal flight and would tend to throw the aircraft out of control.

However, while complementary variance of the thrust in one unit with respect to the other unit is undesirable in horizontal flight, this type of thrust control is essential in vertical take off, as when an aircraft is rising in substantially a vertical direction in order to control the rolling motion of the aircraft about its longitudinal axis. As stated above, this control is not attainable by the use of normal aircraft control surfaces, such as the ailerons, as they have no effect on controlling the rolling movement of the aircraft about its longitudinal axis when the aircraft has substantially no forward movement. Therefore, in order to control the rolling effect of the aircraft in vertical flight, it becomes necessary to complementarily vary the thrust in one unit with respect to the thrust in the other unit through movement of the vanes in each unit. When two units, one on each lateral side, are both driven from a single power plant positioned in the fuselage of the aircraft, it is not feasible to complementarily vary the power to each thrust-generating unit in order to complementarily vary the thrust.

The control system of the present invention allows the vanes in each of the thrust-generating units to be homologously moved when the aircraft is in the horizontal position, and both homologously and complementarily moved when in the vertical position. Therefore, when the aircraft has zero or minimal horizontal movement through the air, roll and lift may be effectively controlled by proper angular positioning of the thrust propulsion units and varying the position of the inlet guide vanes in one unit in either complementary or homologous manner with respect to the guide vanes in the other unit.

To accomplish the above stated performances, the control system of the present invention provides a vane-actuating means for the vanes in each of the thrust-generating units, a control and selectively operable energizing means to actuate the vane-actuating means and impart homologous movements to the vanes in the units, another control and selectively energizing means to actuate the vane-actuating means to impart complementary movement to the vanes in one unit with respect to the vanes in the other unit, and means responsive to change in angular position of the units to render the complementary thrust-energizing means ineffective when the thrust axis of the units is substantially horizontal.

The means responsive to change in angular position of the thrust-generating units includes a novel floating, triaxial, impulse-translating element having an impulse-modulating element connected thereto. These elements modulate and translate the impulses received from the energizing means and the amplitude of movement of vanes in each unit with decrease or increase of the thrust axes of the units to the horizontal, thus rendering the complementary thrust-energizing means ineffective when such thrust axes are substantially horizontal and fully effective when the thrust axes are substantially vertical.

An object of the present invention is to provide a flight control system for an aircraft having a rotatably mounted thrust-generating unit on either side of the longitudinal axis of the aircraft and including means for complementarily varying the thrust in one unit with respect to the thrust produced by the other unit when the units are in substantially vertical position, such means becoming ineffective when the units are in horizontal position.

Another object is to provide a flight control system for an aircraft having a rotatably mounted thrust-generating unit on either side of the longitudinal axis of the aircraft and including means for both homologously and complementarily varying the thrust in one unit with respect to the thrust produced by the other unit when the units are in substantially vertical position, and wherein only homologous variations in thrust are possible when the units are in horizontal position.

Still another object of the invention is to provide a flight control system for an aircraft adapted to rise vertically and fly horizontally after becoming airborne and which supplements the normal aircraft control system to control the rolling movement of the aircraft in vertical flight by means other than the normal ailerons, the rolling movement of the aircraft in horizontal flight being controlled primarily by said ailerons.

Yet another object of the invention is the provision of an aircraft carrying a thrust-generating unit at the lateral extremities of its wing, said units being rotatably mounted about an axis transverse to the longitudinal axis of the aircraft and having a plurality of pivotally mounted radial vanes in or adjacent the inlet portions thereof and acting upon air admitted to said units wherein means are provided for selectively imparting complementary or homologous movement to the vanes in one unit with respect to the vanes in the other unit when the units are in vertical position and only homologous movement to the vanes in each unit when the units are in horizontal position.

A further object is to provide a flight control system for an aircraft having rotatable thrust-generating units with radially extending, pivotally mounted vanes therein, said system having a novel impulse-translating and modulating means responsive to angular position of said units for translating and modulating vane-actuating impulses and the amplitude of movement of the vanes with decrease or increase in angle of the thrust axis of the units with the horizontal.

Other objects and many of the attendant advantages of this invention will be readily appreciated as the same becomes better understood by reference to the following detailed description when considered in connection with the accompanying drawings, wherein:

Fig. 2 is a side elevation, partly in section, of a thrust-generating unit in the vertical position and an end portion of a wing of a horizontally disposed aircraft carrying such unit.

Fig. 3 is a transverse section of the device taken along plane III—III of Fig. 2.

Fig. 4 is a plan view looking in the direction of the arrows along plane IV—IV of Fig. 2.

Fig. 6 is a plan view looking in the direction of the arrows along plane VI—VI of Fig. 5.

Fig. 7 illustrates a somewhat diagrammatic enlarged plan view of the system for homologously varying the thrust in each propulsion unit when they are in the vertical position.

Fig. 8 shows a diagrammatic plan view of the means for homologously varying the thrust in each propulsion unit when they are in the horizontal position.

Figure 1:
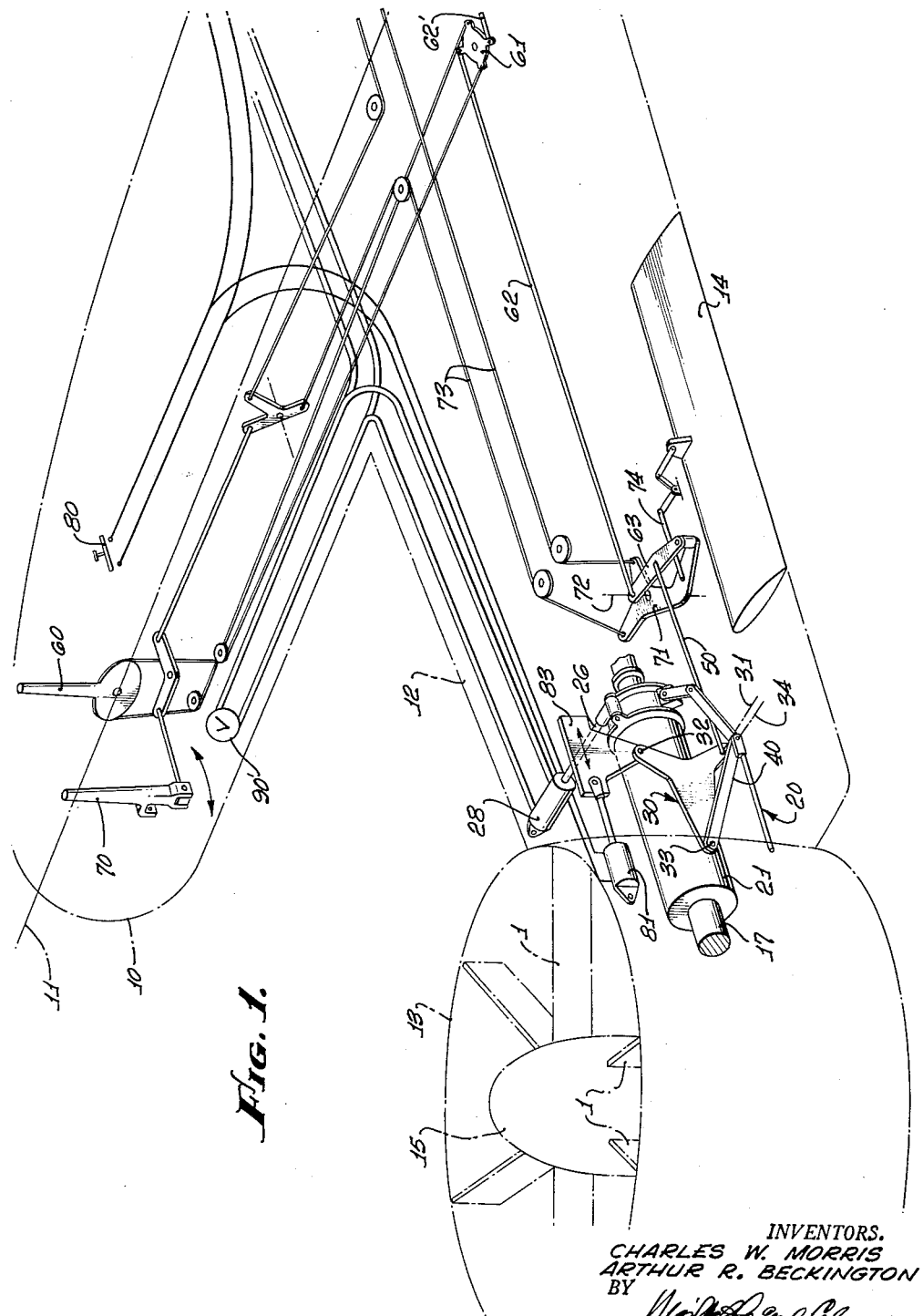
Fig. 1 is a schematic perspective representation of the forward portion of a fuselage and of a wing of an aircraft provided with an exemplary flight control system embraced by this invention.

As stated hereinabove, the copending application, Serial No. 472,313, discloses an airplane having a body and laterally disposed wings, a thrust-producing propulsion unit being carried by the lateral extremity of each of the wings. Each propulsion unit includes a thrust-generating means positioned within an open-ended duct, such thrust-generating means being generally a multibladed rotor or impeller mounted for rotation within the duct or shroud. It is preferred that the wall of each duct has an airfoil section including a leading edge and trailing edge connected by smooth, suitably curved surfaces conducive to smooth airflow; tips of the impeller approach these walls very closely, clearances of the order of 0.02 inch being common. A single, primary power plant or engine may be carried by the body of the airplane and may be used in driving the multibladed elements within two or more of their respective ducts; when the power plant is a turbine or jet, its gases and thrust are preferably discharged rearwardly along an axis substantially coincidental with the axis of the aircraft. Each of the thrust-generating means carried by the lateral extremity of each of the wings includes means for controllably and partially rotating the propulsion units about an axis transverse to the body of an aircraft whereby the thrust generated by such units may be directed downwardly to produce vertical thrust for take-off or hovering purposes, rearwardly for horizontal or forward flight, or at any desired angle between the two virtually extreme positions of vertical and horizontal.

Since roll of the aircraft, when the thrust-propulsion units are in the vertical position, cannot be controlled by the normal aileron surfaces, the present invention provides means positioned in the inlet portions of each of the thrust-generating means for either homologously or complementarily varying the thrust produced by each of the units. It has been found that this is best accomplished by the use of radially extending, pivotally mounted vanes which can be moved to vary the angle of the incoming air with respect to the impeller or rotor blades. By controllably varying the angle of the incoming air into the thrust-producing units, the thrust produced by each of the units can be varied either homologously or complementarily to each other in accordance with the positioning of the inlet guide vanes. A more detailed explanation of how thrust in each of the units may be varied by movement of the radially extending, pivotally mounted guide vanes, may be found in copending application, Serial No. 594,537.

For purposes of this description, the following words will be given the following definitions:

"Complementary Movement" of vanes contemplates two laterally spaced thrust-producing units, each provided with controllably positionable vanes, the vanes in one unit being moved in a direction opposed (in effect) to the direction of movements of vanes in the other unit whereby thrust produced by one unit is increased and that produced by the other unit is decreased.

"Homologous Movement" contemplates movement of vanes in both such units in the same direction, substantially equal effects being obtained on the thrust produced by each unit.

For clarity, Fig. 1 illustrates only the forward portion of a fuselage 10 having a longitudinally extending axis 11 and one wing 12 having a thrust propulsion unit 13 rotatably mounted at its extremity. Being a diagrammatic view, Fig. 1 illustrates the fuselage, wing and thrust-generating unit in dotted lines and the control system of the present invention in solid lines. It should be understood that this aircraft 10 is symmetrical on opposite sides of its longitudinal axis 11 and therefore includes on its other side a wing, a rotatably mounted thrust propulsion unit and a complementary control system for operating the inlet guide vanes as will be described in greater detail hereinafter.

In the exemplary form illustrated, showing the thrust-producing units mounted at the ends of the wings, each of the units 13 comprises a tubular open-ended duct, the walls of which being preferably of airfoil section. A suitably shaped and faired axial nacelle 15 is positioned within each unit, as for example, by means of a spider 15'. The nacelle carries a section including the rotors of impeller blades 16 (which are suitable in number) with tip-end portions which closely approach the inner wall of the duct. Although a single set of impeller blades 16 is illustrated, counter-rotating bladed elements may be contained in these units 13. The impeller blades are driven by a drive shaft 17 preferably extending through the hollow spider 15', and suitable gearing. The drive shaft extends into the wing 12 and is operably connected to the motor or engine 18 (Fig. 8).

The entire thrust-producing unit 13 is connected to the lateral extremity of the wing 12 for controllable rotation about an axis transverse to the longitudinal axis of the aircraft. In the simplified illustration, the entire unit 13 is connected to a hollow trunnion 21 having its outer end suitably journalled in the end wall 22 of the wing 12 and its inboard end suitably journalled in a longitudinally extending supporting member 23 within the wing. This trunnion is suitably and firmly connected to the thrust propulsion unit 13 as by means of an attachment collar 24. The drive shaft 17 extends through this trunnion 21 and is suitably journalled therein. A pair of upwardly extending flanges 25 and 25' are carried by the trunnion 21 and one end of operating rod 26 extends between said flanges and has its end hingedly connected to the flanges by means of a pin 27. The opposite end of the operating rod 26 is connected to a piston within the pressure fluid cylinder 28 connected by suitable tubing or conduits to a source of fluid pressure and the control valve 90'. It will be evident that by suitable operation of the valve 90' the actuating rod 26 may be caused to impart partial rotation to the entire trunnion 21 and the propulsion unit or thrust-producing unit 13. Any other means of controllably imparting a desirable partial rotation to the units 13 between a substantially vertical and a substantially horizontal position may be employed.

The plurality of radially extending vanes 1 carried in the inlet portion of the thrust-producing unit 13 are each pivotally connected at their ends to the axial nacelle 15 and to the outer tubular housing 13. The inner pivot pin 2 of each vane 1 may be provided with a crank arm 2'. All of these crank arms 2' of all of the vanes may be interconnected to a continuous, circular ring element 3 whereby movement of the ring 3 will impart uniform movement to all of the vanes 1. A bell crank 4 pivotally connected to the tubular duct at 5 has one end thereof pivotally connected to the ring 3 and the other end pivotally connected to a rod 6. The opposite end of such rod 6 is connected to bell crank lever 7, the opposite end of the bell crank being pivotally connected to the vane-actuating means 20 adapted to be moved in a circumferential opening 9 in the end wall 22. It will be evident therefore that movement of the vane-actuating means in a direction of its axis (as shown in Fig. 2) will cause the uniform controlled movement of all of the vanes 1 within the unit 13.

With these preliminary matters disposed of, the general operation of the control system of this invention will be described.

The thrust propulsion unit 13, shown in Fig. 1, is the vertical position which is required for vertical take-off or hovering. In this position, it can clearly be seen that the thrust generated by this unit will cause the aircraft to rise vertically or hover with substantially no forward movement. Therefore, the normal control surfaces such as the aileron 14, which have no air flowing over its outer surfaces, would have an effect in controlling the roll of the aircraft about its longitudinal axis 11. Therefore, when the units are in the vertical position, the thrust generated by the units can only be effectively controlled and varied by movement of pivotally mounted, radially extending guide vanes 1 positioned in the inlet portions of each of the units. When complementary movement is imparted to the guide vanes in the laterally spaced thrust-generating units, the thrust produced by one unit will be increased in amount complementary to the decrease in thrust produced by the other unit, and vice versa. By controlling this complementary thrust in each of the units, the pilot can effectively control the rolling of the aircraft about its longitudinal axis 11 when the aircraft is in substantially vertical flight or in a hovering condition. Moreover, the pilot, while in a hovering position, may desire to move the vanes in both units in a homologous manner to cause a uniform joint increase, decrease or variation of the thrust produced by both units to cause the aircraft to be elevated or lowered without the use of the normal throttling means connected to the engine. Therefore, it should be understood that when the thrust propulsion units are in a substantially vertical position, as shown in Figs. 1 and 2, the invention permits the inlet guide vanes to be controllably moved in both homologous and complementary manner. By this provision, the roll and lift of the aircraft while in substantially vertical flight can be effectively controlled.

Figure 5:
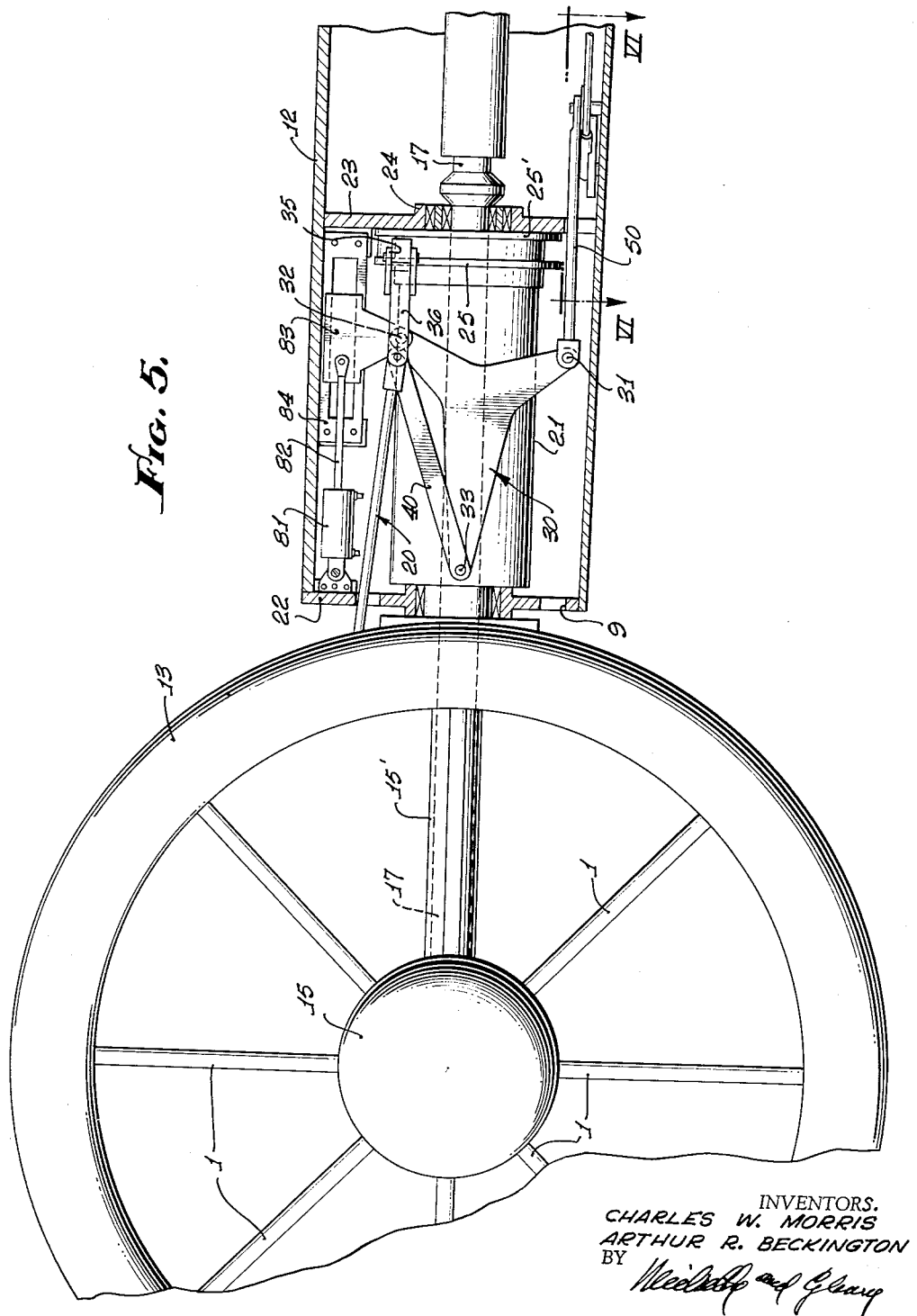
Fig. 5 is a side elevation, similar to Fig. 2 except the thrust-generating unit is in the horizontal position.

After becoming airborne, the vertical take-off aircraft can fly horizontally or assume a forward flight position by merely having its thrust-generating units 13 controllably rotated 90° into a horizontal position, as shown in Fig. 5. In this position, any complementary movement of the vanes in one unit with respect to the vanes in the other unit would cause a yawing effect of the aircraft about its vertical or yaw axis.

To eliminate any possibility of the pilot accidentally moving the guide vanes in such a manner when in horizontal flight, means are provided in the present control system, for rendering the control and selectively operable energizing means for actuating the vanes in a complementary manner ineffective when the thrust propulsion units have been rotated into the horizontal position. This means is responsive to change in the angular position of the units and renders the complementary energizing means ineffective when the thrust axes of the units are horizontal and becomes increasingly more operable in all positions from virtually horizontal to vertical. However, in the horizontal position, the radially extending guide vanes in each of the units may be moved homologously to uniformly vary the thrust produced by the units. In addition, there is another advantage for homologously moving the inlet guide vanes in each of the units in that the effective loading on the impellers or rotors can be varied and controlled when the units are in horizontal position. These impellers or rotors may have a fixed pitch which is designed for maximum load when the units are in the vertical position during take-off or hovering. When the units are rotated into a horizontal position, the impellers are under substantially less loading and therefore would tend to speed up or rotate faster than originally designed; this would also tend to cause the power plant or driving engine to speed up. Therefore, by effectively changing the angle of the incoming air with respect to the impellers or rotors, it is possible to increase or decrease the loading on the impellers to maintain the impellers under a uniform loading in horizontal as well as vertical position.

To effectively control the position of the inlet guide vanes in each of the units, the vane-actuating means 20 imparts impulses from various control and selectively operable energizing means 60, 70, 80 (operable by the pilot), to position the inlet guide vanes 1 in each of the unit. All vane-actuating impulses are transmitted to the vane-actuating means 20 by a triaxial impulse translating element 30 through an impulse-modulating element 40. The triaxial impulse-translating element 30 has two spaced impulse-receiving axes, a vertical thrust axis 31 and a horizontal thrust axis 32 and an amplifying pivot axis 33.

It may be assumed for the purposes of the immediately succeeding description that the thrust axis 32 is fixed and that the entire triaxial impulse-translating element 30 is suspended from this axis. With the thrust units 13 positioned with their axes vertical, manual operation of the control 60 will result in homologous movement of the vanes 1 in both of the laterally spaced thrust units in the following manner: Movement of the control 60 imparts movement to the transmitting, self-locking pulley 61 through suitable cables, rod 62 and lever 63 of what is termed selectively operable energizing means. Lever 63 is a second class lever, one end of which is connected to an end of the first class lever 71 (mounted upon a fixed axis 72). The intermediate portion of lever 63 is connected to the impulse delivery rod 50 which has its opposite end pivotally connected to the vertical thrust axis 31 of the impulse-translating element 30. Axial movement of the rod 50 thereby causes pivotal movement of the impulse-translating element 30 about axis 32 and imparts movement to the impulse-modulating element 40 which in turn is pivotally connected to and axially moves the vane-actuating means 20, thereby causing controlled pivotal movement and positioning of the vanes 1. The means 61, previously referred to assures homologous movement, i.e., equal movement in the same direction is imparted to the vanes in both of the thrust-producing units 13.

In order to obtain complementary movement of the vanes in the two units, control 70 is actuated and by relatively well known customary cable means imparts an impulse or movement to the opposite end of the first class lever 71, that is, to that end of lever 71 opposed to the end to which the second class lever 63 is pivoted. Pivotal movement of the first class lever 71 about its axis 72 again imparts motion to the second class lever 63 and to the impulse-delivery rod 50, but this time the impulses delivered by the rod 50 and its counterpart on the opposite side of the aircraft are complementary (in opposed directions) and therefore complementary change in inclination of the vanes in the two units 13 is attained.

When the units are being moved from vertical to horizontal position, the pilot or operator actuates a valve or other suitable mechanism 90' to move the piston in cylinder 28 thereby causing the rod 27 to partially rotate the entire trunnion 21 and the unit 13. Controlled homologous partial rotation of both units 13 is attained.

In accordance with this invention a positioning means responds to change in angular position of the thrust units and is operably connected to the impulse-modulating element 40 so as to move the latter in accordance with change in angular direction of thrust of the units. The positioning means and modulating element render controls 60 and 70 ineffective when the units assume a horizontal position.

The positioning means to which reference has been had include link 35 (Fig. 4) hingedly connected at one end to the flanges 25 and 25' on the trunnion 21 and pivotally connected at its other end to one end of a link 36. The other end of link 36 is pivotally connected to the movable ends of the impulse-modulating element 40 and the vane-actuating means 20 at the impulse-modulating axis 34. It can thus be seen that when the trunnion 21 is rotated to move the units 13 from the vertical position shown in Fig. 2 to the horizontal position shown in Fig. 5, by means of the positioning linkage 35 and 36, the movable end of the impulse-modulating element 40 and vane-actuating means 20, both pivotally mounted about axis 34, will be moved upwardly so that the modulating axis 34 is in substantial alignment with the horizontal thrust axis 32 (see Fig. 5). In this position, impulses received at the vertical thrust axis 31 will only pivot the element 30 about the horizontal thrust axis 32 and will not impart movement to the vane-actuating means 20. Thus, controls 60 and 70 are ineffective when the units have been rotated into the horizontal position (Fig. 5).

Assuming now for purposes of the immediately succeeding description that thrust axis 31 is fixed and that the entire triaxial impulse-translating element 30 is suspending from this axis, with the units 13 positioned with their axes horizontal, manual operation of the control 80 will result in homologous movement of the vanes 1 in both of the laterally spaced thrust units in the following manner: Movement of the control or closing of the switch 80 will energize an actuator 81 which controls the movement of armature 82 connected to a guide block 83 movable in a guide 84 which is secured to the wing 12. The block 83 is pivotally connected to the impulse-translating element 30 at the horizontal thrust axis 32 and moves such element about the now assumed fixed thrust axis 31 and actuates the vane-actuating means 20 through the modulating element 40.

Therefore, when the units 13 have their axes in the horizontal position, actuation of control 80 will produce homologous movement of the vanes 1 in each of the units 13; while in this position controls 60 and 70 are ineffective. It should be noted that when the units 13 have their axes in the vertical position, control 80 is ineffective to move the vanes 1 in each of the units while controls 60 and 70 are operative.

With the means provided in the present control system, when the axes of the units 13 are in an angular position, between vertical and horizontal, impulses received at either the vertical thrust axis 31 or the horizontal thrust axis 32 of the element 30 from controls 60, 70 or 80 will be proportionately transmitted to the vane-actuating means 20. It is thus possible to effectively control the position of the inlet guide vanes 1 in each of the units 13 in all angular positions between vertical and horizontal. This function is important as it is contemplated that the units 13 can be positioned, for example, at a 45° angle with the horizontal and thus have a combination of forward and vertical thrust enabling the aircraft to take off on a runway of much shorter length than is ordinarily required by a standard aircraft.

Means may be connected to the control stick 60 for automatically biasing the engine power in response to an increase or decrease in lift due to movement of the vanes. An engine-biasing control rod 66 (Fig. 7) may be connected from the power control unit on the engine 18 to the control stick 60 by any suitable linkage. As the control stick 60 is actuated to simultaneously move rods 62 and 62' to increase lift in the units 13 and 13', the power in the engine through rod 66 may also be increased to produce greater thrust in each unit; when lift is decreased in both units 13 and 13' by opposite movement of control stick 60, the power from the engine through rod 66 may be proportionately decreased to each of the units.

It is also contemplated that the engine-biasing control rod 66 may be actuated by a manually controlled pilot-energizing means 67 in order to increase or decrease power from the engine to both of the thrust-generating units 13 and 13'. However, actuation of this manual means 67 will only move the engine-biasing control rod 66 and not effect the operation of the control stick 60 for imparting homologous movements to the inlet guide vanes 1.

The control or switch 80 may be operatively connected to control the actuating solenoids 81 and 81' (Fig. 8) and allow the coils of each solenoid to be energized or de-energized by means of power supplied by a source 86. The actuators are designed so that their armatures 82 and 82' are simultaneously moved outwardly and inwardly when the coils in the actuators are energized and de-energized, respectively. Therefore, when the units are in horizontal position (Fig. 8), and it is desired to increase the loading on the impellers in the units, the switch 80 can be operated to uniformly energize the solenoids and move the vanes 1 in each unit.

A second manually operated switch 87 may be operatively connected from the power source 86 to the coils of each of the actuators 81 and 81' to return the inlet guide vanes 1 and 1' to neutral position by reversing the energization to the actuator coils.

It is further contemplated that an automatic means may be provided for moving the vanes 1 and 1' when the units 13 and 13' are in the horizontal position in response to increase or decrease in the speed of the engine 18. A trunnion operated switch 88 may be provided in the electrical system between the power source 86 and the actuator coils and is adapted to be operated in response to rotation of the trunnion means 21. When the units are in the horizontal position, switch 88 will be closed and when the units are in vertical position, switch 88 will be open.

A pair of spaced, governor-operated, push-type switches 89 and 90 may be connected in the system and are adapted to be actuated independently by a switch-actuating toggle 91 controlled by a governor 92 connected to the engine 18.

The switch 89 is connected to the actuator coils and the power source 86 to return the actuators to neutral or zero position when actuated by the toggle 91 in response to the engine operating at substantially normal speed. The switch 90 is adapted to be actuated by a toggle 91 in response to high r.p.m. of the engine and is connected to the actuator coils to simultaneously move the armatures 84 and 84' outwardly thus homologously rotating the inlet guide vanes 1 and 1'.

It should be understood that the various electrical and hydraulic systems described are merely illustrative and can be varied and changed without departing from the scope of this invention.

The aft or outlet portion of the thrust units 13 may also include pivotally mounted or articulatable vanes subject to the same or separate controls, such as the articulated vanes of a copending application filed by Mark G. Bislawn.

Obviously many modifications and variations of the present invention are possible in the light of the above teachings. It is therefore to be understood that within the scope of the appended claims the invention may be practiced otherwise than as specifically described.

We claim:

1. In an aircraft carrying a pair of open-ended thrust-generating units in laterally spaced relation on opposite sides of the longitudinal axis of the aircraft, said units being mounted for controllable partial rotation about an axis transverse to said longitudinal axis to deliver thrust without impingement upon the aircraft in all angular positions of the units between horizontal and vertical, the provision of: a plurality of radially arranged pivotally mounted vanes in the inlet portion of each of said units; a vane actuating means for each of said units; a control and selectively operable energizing means to actuate the vane actuating means and impart homologous movement to vanes in said units; a control and selectively operable energizing means to actuate the vane actuating means to impart complementary movement to vanes in one unit with respect to vanes in the other unit; and means responsive to change in angular position of said units to render said last named energizing means ineffective when the thrust axis of said units is substantially horizontal.

2. In an aircraft carrying a pair of open-ended thrust-generating units in laterally spaced relation on opposite sides of the longitudinal axis of the aircraft, said units being mounted for controllable partial rotation about an axis transverse to said longitudinal axis to deliver thrust without impingement upon the aircraft in all angular positions of the units between horizontal and vertical, the provision of: a plurality of radially arranged pivotally mounted vanes in the inlet portion of each of said units; a vane actuating means for each of said units; a control and selectively operable energizing means to actuate the vane actuating means and impart homologous movement to vanes in said units; a control and selectively operable energizing means to actuate the vane actuating means to impart complementary movement to vanes in one unit with respect to vanes in the other unit; and means, responsive to change in angular position of said units to modulate said last named energizing means and the amplitude of the complementary movement of the vanes with decrease in angle of the thrust axis of the units to the horizontal and to render said last named energizing means ineffective when such thrust axis is substantially horizontal.

3. In an aircraft carrying a pair of open-ended thrust-generating units in laterally spaced relation on opposite sides of the longitudinal axis of the aircraft, said units being mounted for controllable partial rotation about an axis transverse to said longitudinal axis to deliver thrust without impingement upon the aircraft in all angular positions of the units between horizontal and vertical, the provision of: a plurality of radially arranged pivotally mounted vanes in the inlet portion of each of said units; a vane actuating means for each of said units; a control and selectively operable energizing means to actuate the vane actuating means and impart homologous movement to vanes in said units; a control and selectively operable energizing means to actuate the vane actuating means to impart complementary movement to vanes in one unit with respect to vanes in the other unit; means responsive to change in angular position of said units to render said last named energizing means ineffective when the thrust axis of said units is substantially horizontal; and a further control and selectively operable energizing means to actuate the vane actuating means to impart homologous movement to the vanes in said units when the thrust axis thereof is virtually horizontal.

4. In an aircraft carrying a pair of open-ended thrust-generating units in laterally spaced relation on opposite sides of the longitudinal axis of the aircraft, said units being mounted for controllable partial rotation about an axis transverse to said longitudinal axis to deliver thrust without impingement upon the aircraft in all angular positions of the units between horizontal and vertical, the provision of: a plurality of radially arranged pivotally mounted vanes in the inlet portion of each of said units; a vane actuating means for each of said units; a control and selectively operable energizing means to actuate the vane actuating means and impart homologous movement to vanes in said units; a control and selectively operable energizing means to actuate the vane actuating means to impart complementary movement to vanes in one unit with respect to vanes in the other unit; means, responsive to change in angular position of said units to modulate said last named energizing means and the amplitude of the complementary movement of the vanes with decrease in angle of the thrust axis of the units to the horizontal and to render said last named energizing means ineffective when such thrust axis is substantially horizontal; and a further control and selectively operable energizing means to actuate the vane actuating means to impart homologous movement to the vanes in said units when the thrust axis thereof is virtually horizontal.

5. An aircraft, including a body and laterally extending wings; an open-ended, thrust-generating unit carried at the lateral extremity of each of said wings; controllable means for varying the angular position of said units between horizontal and vertical; a plurality of radial vanes in the inlet portion of each of said units and means for selectively and controllably varying the effective angle of said vanes with respect to the thrust axis of each of said units including a floating, triaxial, impulse-translating element having two spaced impulse-receiving axes, one being a horizontal thrust axis and the other a vertical thrust axis, and an amplifying axis equidistant from and parallel to said impulse-receiving axes; one of said impulse-receiving axes being fully effective when said units are in vertical position and the other axis being fully effective when said units are in horizontal position; an impulse-modulating element having one end pivotally connected to said amplifying axis and another end movable between points substantially adjacent each of said two impulse-receiving axes; a vane-actuating means connected to said movable end of the impulse-modulating element for moving said vanes; a positioning means responsive to change in angular position of the thrust units and operably connected to the impulse-modulating element for moving the latter in accordance with change in angular direction of thrust of the units; and selectively operable energizing means to transmit controlled impulses to the triaxial impulse-translating element at one of said impulse-receiving axes to thereby actuate the vane-actuating means, said positioning means and modulating element rendering said energizing means inoperable when the units are in horizontal position, and said triaxial element and impulse-modulating element converting impulses transmitted thereto by the selectively operable means into movement of the vanes varying in amplitude in proportion to the angular position of the units with respect to a horizontal plane.

6. In an aircraft as stated in claim 5 including a further selectively operable energizing means connected to the horizontal thrust axis of the triaxial element for holding said horizontal thrust axis stationary when said units are vertical and said other energizing means is operative, and for imparting impulse and movement to said horizontal thrust axis to move the vane-actuating means and impart homologous movement to vanes in said units in response to a further control when said units are horizontal.

7. In an aircraft as stated in claim 5 wherein said selectively operable energizing means includes a first-class lever having one end operable by a control for complementary movement of vanes in said units, a second-class lever connected to the other end of said first-class lever and operably connected to another control for homologous movement of vanes in said units, said second-class lever being connected to an impulse-delivery rod for delivering impulse to the vertical thrust-receiving axis of the triaxial element.

8. In an aircraft as stated in claim 7 including a further selectively operable energizing means connected to the horizontal thrust axis of the triaxial element for holding said horizontal thrust axis stationary when said units are vertical and said other energizing means is operative, and for imparting impulse and movement to said horizontal thrust axis to move the vane-actuating means and impart homologous movement to vanes in said units in response to a further control when said units are horizontal.

9. A controllable aircraft including a thrust-generating unit on each side and spaced from the longitudinal axis of the aircraft, means for adjustably and simultaneously varying the angular position of said units about an axis transverse to said longitudinal axis through an angle of about 90° to deliver thrust at a desired angle to horizontal without impingement of said thrust upon the aircraft in all positions of said units; adjustably positionable radial vanes in each of said units to control the thrust generated thereby; vane-actuating means for controllably varying the position of said vanes; a control and selectively operable energizing means for imparting impulses to said actuating means to vary the thrust of said units when the units are in all positions between virtually horizontal and vertical and becoming inoperable when the units are horizontal; a second control and selectively operable energizing means for imparting impulses to said actuating means to vary the thrust of said units when the units are in all positions between virtually vertical and horizontal and becoming inoperable when the units are vertical; and means responsive to change in angular position of said units to oppositely modulate each of said energizing means when the units are in all positions between virtually horizontal and virtually vertical and render the first energizing means inoperable when the units are horizontal and render said second energizing means inoperable when the units are vertical, each of said energizing means thus being proportionately operable when the units are in positions other than vertical and horizontal.

10. In a flight control system for an aircraft including a thrust-generating unit on each side of the longitudinal axis of the aircraft comprising: means for adjustably varying the angular position of said units about an axis transverse to the longitudinal axis; a plurality of radially extending pivotally mounted vanes in each of said units for controllably varying the thrust generated by said units; and means for controllably varying the position of said vanes and being responsive to change in angular position of said units to become operable when the units are in all positions between vertical and virtually horizontal and inoperable when the units are in horizontal position.

11. In a flight control system for an aircraft including a thrust-generating unit on each side of the longitudinal axis of the aircraft comprising: means for adjustably varying the angular position of said units about an axis transverse to the longitudinal axis; a plurality of radially extending pivotally mounted vanes in each of said units for controllably varying the thrust generated by said units; and means for controllably varying the position of said vanes and being responsive to change in angular position of said units to become operable when the units are in all positions between horizontal and virtually vertical and inoperable when the units are in vertical position.

12. In an aircraft having a thrust-generating unit rotatably mounted on each side of the longitudinal axis of the aircraft and a plurality of adjustably positionable radial vanes in each of said units to control the thrust generated thereby; a floating, triaxial impulse-translating element having two spaced impulse-receiving axes and an amplifying axis equidistant from and parallel to said impulse-receiving axes; an impulse-modulating element having one end pivotally connected to said amplifying axis and another end movable between points substantially adjacent each of said two impulse-receiving axes; a vane-actuating means connected to said movable end of the impulse-modulating element for moving said vanes; and a positioning means responsive to change in angular position of the thrust units and operably connected to the impulse-modulating element for moving the latter in accordance with change in angular direction of thrust of the units.

References Cited in the file of this patent
UNITED STATES PATENTS

| | | |
|---|---|---|
| 1,734,251 | Gallet | Nov. 5, 1929 |
| 2,702,168 | Platt | Feb. 15, 1955 |
| 2,828,929 | Lippisch | Apr. 1, 1958 |
| 2,874,920 | Mallinckrodt | Feb. 24, 1959 |